US008350830B2

(12) United States Patent  (10) Patent No.: US 8,350,830 B2
Hosoi et al.  (45) Date of Patent: Jan. 8, 2013

(54) INPUT DEVICE AND INFORMATION PROCESSING SYSTEM

(75) Inventors: Kazuhiro Hosoi, Kyoto (JP); Yasuyuki Shimohata, Kyoto (JP); Toru Yamashita, Kyoto (JP); Ryoji Kuroda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 414 days.

(21) Appl. No.: 12/821,712

(22) Filed: Jun. 23, 2010

(65) Prior Publication Data

US 2011/0261012 A1    Oct. 27, 2011

(30) Foreign Application Priority Data

Apr. 22, 2010    (JP) ................................. 2010-098576

(51) Int. Cl.
*G06F 3/042*    (2006.01)
*G09G 5/00*    (2006.01)
(52) U.S. Cl. ........................................ 345/175; 345/156
(58) Field of Classification Search .................. None
See application file for complete search history.

(56) References Cited

U.S. PATENT DOCUMENTS

| 6,352,351 | B1 * | 3/2002 | Ogasahara et al. | 362/613 |
| 6,498,860 | B1 * | 12/2002 | Sasaki et al. | 382/103 |
| 6,518,959 | B1 * | 2/2003 | Ito et al. | 345/175 |
| 8,149,224 | B1 * | 4/2012 | Kuo et al. | 345/173 |
| 2004/0235566 | A1 * | 11/2004 | Hussaini et al. | 463/37 |
| 2008/0268956 | A1 * | 10/2008 | Suzuki | 463/37 |

FOREIGN PATENT DOCUMENTS

JP    2007-83024    4/2007

* cited by examiner

*Primary Examiner* — Christopher R Lamb
(74) *Attorney, Agent, or Firm* — Nixon & Vanderhye, P.C.

(57) ABSTRACT

A game system as an information processing system includes a game apparatus and a controller, and the controller is attached with an attachment device. The controller images an image including infrared rays output from markers arranged on a monitor through a half mirror integrated in the attachment device. Furthermore, the controller images an image including an infrared ray from a pen input device reflected by the half mirror via a touch panel. In the former, the controller functions as an input device for a direct coordinate input, and in the latter, the controller functions as a pen tablet.

8 Claims, 10 Drawing Sheets

(A) WHEN CONTROLLER IS USED AS POINTING DEVICE (B) WHEN CONTROLLER IS USED AS PEN TABLET (A) TOUCH PANEL  360b

INPUT DEVICE AND INFORMATION PROCESSING SYSTEM

CROSS REFERENCE OF RELATED APPLICATION

The disclosure of Japanese Patent Application No. 2010-98576 is incorporated herein by reference.

BACKGROUND OF THE INVENTION

1. Field of the Invention

The present invention relates to an input device and an information processing system. More specifically, the present invention relates to an input device having an imaging device and an information processing system.

2. Description of the Related Art

One example of the related art is disclosed in Japanese Patent Application Laid-Open No. 2007-83024 [A63F 13/06, H01H 9/02] (Document 1) laid-open on Apr. 5, 2007. In the information processing system of the Document 1, infrared rays output from two LED modules arranged around a monitor are imaged by an imaging device of an imaged information arithmetic unit provided at a front end of a controller. An image processing circuit of the imaged information arithmetic processing unit performs processing on the imaged image including the infrared rays to obtain positions and area information of the two LED modules as information of the high-intensity points. The data of the positions and the sizes of the high-intensity points are transmitted from the controller to the game machine, and are received by the game machine. When a player moves the controller, the data of the positions and the sizes of the high-intensity points are changed, and therefore, by utilizing them, the game machine can fetch an operation signal in correspondence with a movement of the controller, and directly input coordinates and input a rotation within the screen.

However, in the information processing system in the Document 1, the controller provided with the imaging device is used only as a pointing device for directly inputting coordinates and inputting a rotation, and thus, there is a room for developing another usage.

SUMMARY OF THE INVENTION

Therefore, it is a primary object of the present invention to provide a novel input device and a novel information processing system.

Another object of the present invention is to provide an input device and an information processing system capable of effectively utilizing an imaging device.

A first invention is an input device transmitting data to an information processing apparatus. The input device comprises an imaging device; a position calculator which calculates a position of a high-intensity part within an image imaged by the imaging device; a transmitter which transmits data as to a position of the high-intensity part; a half mirror which is provided in an imaging direction of the imaging device, passes light in the imaging direction, and reflects light in a direction different from the imaging direction toward the imaging device; a panel which is provided at a position enabling light to be incident to the half mirror, and is able to making an input through an input portion having at least a first light source.

According to the first invention, an image including light in an imaging direction and an image including light in a direction different from the imaging direction are imaged, and therefore, it is possible to calculate a position of a high-intensity part corresponding to light within the imaged image in each direction. Thus, it is possible to provide an input device effectively utilizing the imaging device provided to the input device.

A second invention is according to the first invention, and further comprises a second light source which is arranged in a specific position between the half mirror and the panel. For example, the second light source emits light in a case that a pen or a finger touches the panel, and it does not emit light in a case that a pen or a finger does not touch the panel.

According to the second invention, by imaging the image including the light from the second light source, it is possible to determine whether or not a pen or a finger touches the panel.

A third invention is according to the second invention, and further comprises a detector which detects a touch of the panel. The second light source emits light when the detector detects a touch of the panel. Furthermore, the second light source does not emit light when the detector does not detect a touch of the panel.

According to the third invention, the detector is provided, so that it is possible to easily make the second light source light up and off depending on whether the pen or a finger touches the panel.

A fourth invention is according to the third invention, and the panel and the detector are a touch panel. Thus, when a pen or a finger touches the touch panel, a signal indicating a touch is output from the touch panel.

According to the fourth invention, by utilizing a signal output from the touch panel, it is possible to emit light from the second light source.

A fifth invention is according to the fourth invention, and comprises: a first unit which includes the imaging device, the position calculator, and the transmitter; and a second unit which is detachably attached to the first unit, and includes the half mirror, the panel, the detector, and the second light source.

According to the fifth invention, the first unit and the second unit are detachably provided, so that it is easily change the configuration of the input device according to the usage, A sixth invention is according to the first invention, and a size of the panel is decided on the basis of an angle of view of the imaging device (imager).

According to the sixth invention, the size of the panel is decided on the basis of the angle of view of the imaging device, and therefore, it is possible to provide a panel approximately the same size (range) which can be imaged by the imaging device, for example. That is, a panel larger than required need not be provided, and a panel for which a range of the operation input is made smaller uselessly need not be provided.

A seventh invention is an information processing system including an input device according to the first invention and an information processing apparatus executing information processing by receiving data from the input device. The information processing apparatus comprises: a receiver which receives data as to the position transmitted by the transmitter; a determiner which specifies a position following the data as to the position received by the receiver, and determines the presence or absence of the light from the second light source; a first information processor which executes first information processing based on the data as to the position in a case that the determiner determines that there is light from the second light source; and a second information processor which executes second information processing different from the first information processing based on the data as to the position in a case that the determiner determines that there is not light from the second light source. Accordingly, the information processing apparatus executes different information processing between a case that a pen or a finger touches the panel and a case that a pen or a finger does not touch the panel.

According to the seventh invention, depending on the presence or absence of the light from the second light source, different information processing is executed, so that it is possible to effectively use the imaging device similar to the first invention.

An eighth invention is according to the seventh invention, and further comprises: a third light source which is arranged at a predetermined position, and a light source controller which turns the third light source off when the first information processor executes the first information processing. Accordingly, the first information processor executes the first information processing on the basis of the first light source, and the second information processor executes the second information processing on the basis of the third light source.

According to the eighth invention, in a case that the first information processing is executed, the third light source is turned off, and therefore, it is possible to reduce useless electric power consumption.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
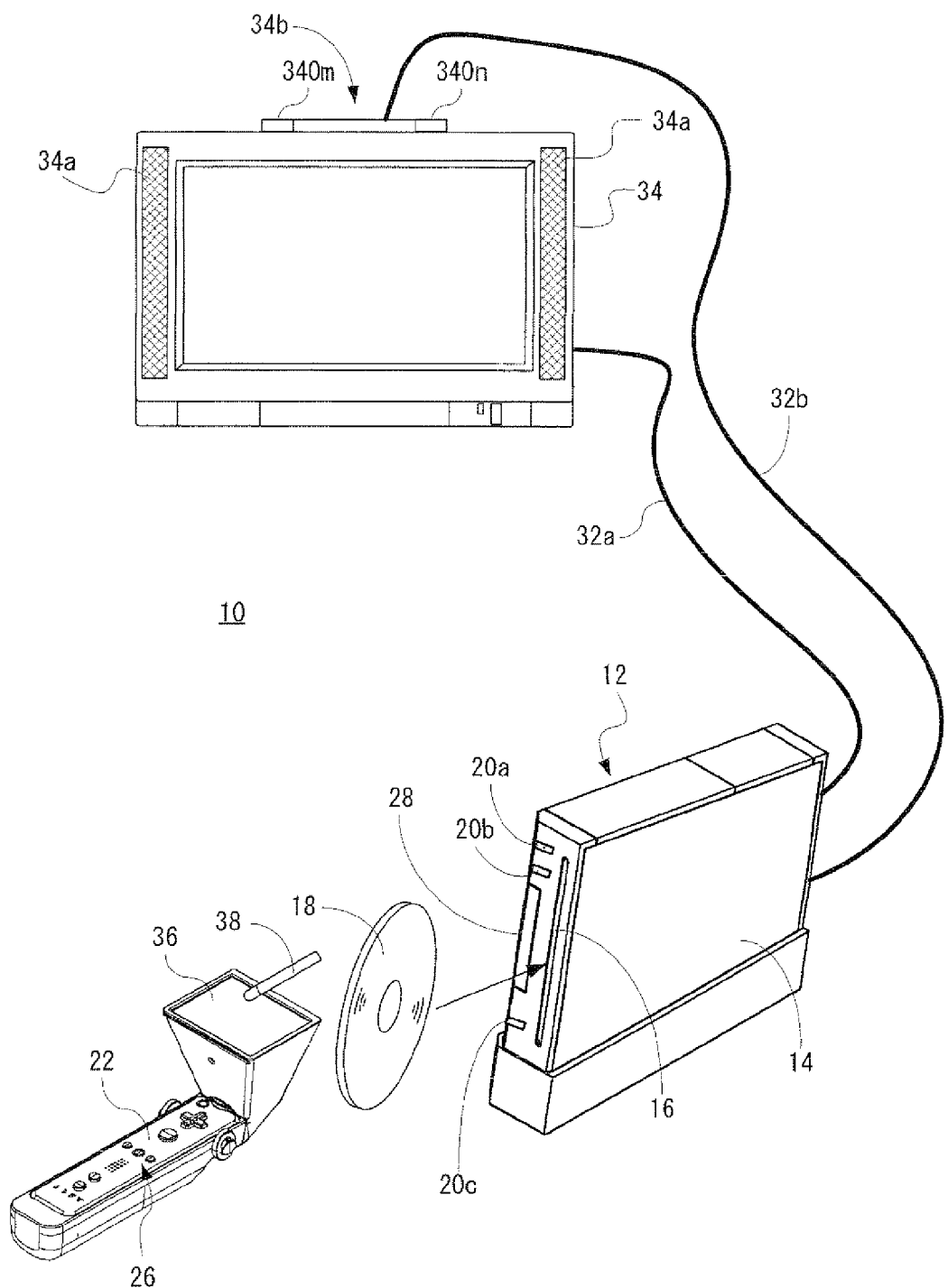
FIG. 1 is an illustrative view showing one embodiment of a game system of the present invention.

Referring to FIG. 1, a game system 10 of one embodiment of an information processing system of the present invention includes a video game apparatus (hereinafter, simply referred to as "game apparatus") 12 and a controller 22. Although illustration is omitted, the game apparatus 12 of this embodiment is designed such that it can be connected to four controllers 22 at the maximum. Furthermore, the game apparatus 12 and each of the controllers 22 are wirelessly connected. The wireless communication is executed according to a Bluetooth (registered trademark) standard, for example, but may be executed by other standards such as infrared rays, a wireless LAN, etc. Alternatively, they may be connected by wire. Here, as shown in FIG. 1, the controller 22 is attached with an attachment device 36. The attachment device 36 can be attached to and detached from the controller 22. Furthermore, the game system 10 is provided with a pen-shaped input device (pen input device) 38 for making an input through the attachment device 36.

The game apparatus 12 includes a roughly rectangular parallelepiped housing 14, and the housing 14 is furnished with a disk slot 16 on a front surface. An optical disk 18 as one example of an information storage medium storing a game program, etc. is inserted from the disk slot 16 to be loaded into a disk drive 54 (see FIG. 2) within the housing 14. Although omitted in the illustration, around the disk slot 16, an LED and a light guide plate are arranged so as to make the disk slot 16 light up and off or flash in response to various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. Here, storing the game data described above may be performed on an internal memory, such as a flash memory 44 (see FIG. 2) provided inside the game apparatus 12 in place of the memory card. Also, the memory card may be utilized as a backup memory of the internal memory. In addition, in the game apparatus 12, an application other than the game can be executed, and in such a case, data of the other application can be saved in the memory card.

It should be noted that a general-purpose SD card can be employed as a memory card, but other general-purpose memory cards, such as memory sticks, multimedia cards (registered trademark) can be employed.

Although omitted in FIG. 1, the game apparatus 12 has an AV cable connector 58 (see FIG. 2) on the rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal thereof. Accordingly, a game image of a three-dimensional (3D) video game, for example, is displayed on the screen of the color television (monitor) 34, and stereo game sound, such as a game music, a sound effect, etc. is output from right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340*m* and 340*n* emit lights so as to output infrared rays ahead of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 recording a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the operating buttons of the input means 26, a game or other application is started. Besides the operation performed on the input means 26, it is possible to move a moving image object (player object) in different directions or change the perspective of the user (camera position) in a three-dimensional game world. Furthermore, as described later, when characters, figures, symbols, images, etc. (hereinafter referred to as "character, etc.") are drawn on a panel (touch panel 360*b* in this embodiment) by utilizing a pen input device 38 provided with a light source 38*a* while the attachment device 36 is attached, predetermined information processing according to the drawn character, etc. can be executed.

An example of the predetermined information processing is that when by using the controller 22 attached with the attachment device 36, a character, etc. is drawn with the use of the pen input device 38, the drawn character, etc. is displayed on the monitor 34. Thus, it is possible to execute an application of practicing a character and drawing a picture, for example. Furthermore, in a case that the game apparatus 12 has an electronic mail function and a function of transmitting and receiving messages, predetermined information processing, such as inputting a title and a text of an outgoing mail and a transmitted message is executed. In addition, in a case that an application software of an action game is executed by the game apparatus 12, the predetermined information processing, such as causing the player character to make an arbitrary action, and input a command is executed by inputting a character, etc.

These are merely examples and should not be interpreted restrictively. It is to be understood by attaching the attachment device 36 to the controller 22, an input by using the pen input device 38 is made possible.

It should be noted that the video game and other application programs are stored (installed) in an internal memory (flash memory 42 (see FIG. 2)) of the game apparatus 12, and may be executed in the internal memory. In such a case, a program stored in a storage medium like the optical disk 18 may be installed in the internal memory, and the downloaded program may be installed in the internal memory.

Figure 2:
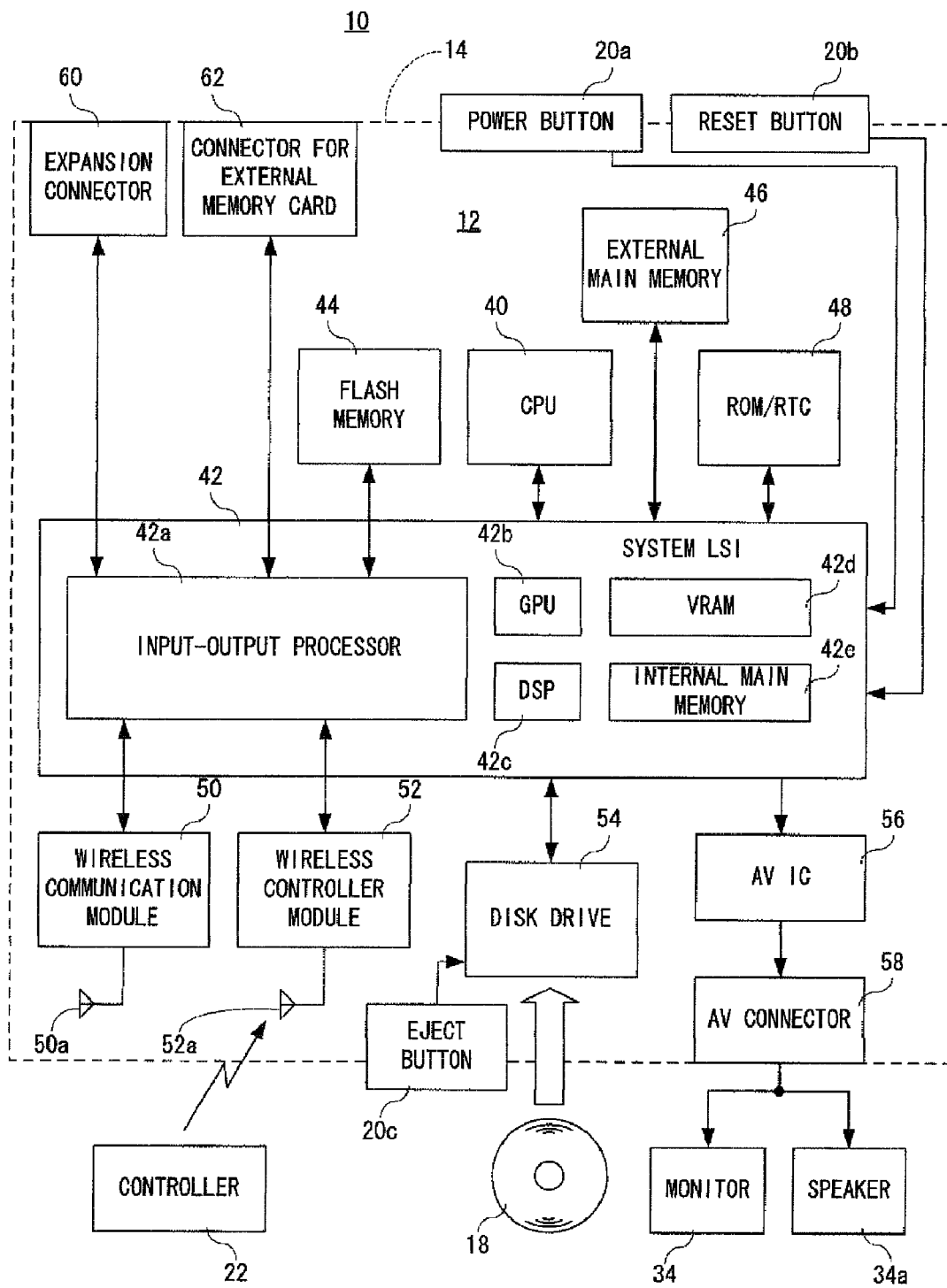
FIG. 2 is a block diagram showing an electric configuration of the game system shown in FIG. 1.

FIG. 2 is a block diagram showing an electric configuration of the game system 10 of FIG. 1 embodiment. Although illustration is omitted, respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, the disk drive 54, and an AV IC 56. The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program, image data, sound data etc. from the optical disk 18, and writes them in an internal main memory 42*e* described later or the external main memory 46 under the control of the CPU 40.

The system LSI 42 is provided with an input-output processor 42*a*, a GPU (Graphics Processor Unit) 42*b*, a DSP (Digital Signal Processor) 42*c*, a VRAM 42*d* and an internal main memory 42*e*, and these are connected with one another by internal buses although illustration is omitted. The input-output processor (I/O processor) 42*a* executes transmission and reception of data and executes download of the data. The transmission and reception of data is described later.

The GPU 42*b* is made up of a part of a depicting means, and receives a graphics command (construction command) from the CPU 40 to generate game image data according to the command. Additionally, the CPU 40 applies an image generating program required for generating game image data to the GPU 42*b* in addition to the graphics command.

Although illustration is omitted, the GPU 42*b* is connected with the VRAM 42*d* as described above. The GPU 42*b* accesses the VRAM 42*d* to acquire data (image data: data such as polygon data, texture data, etc.) required to execute the construction command. Here, the CPU 40 writes image data required for drawing to the VRAM 42*d* via the GPU 42*b*. The GPU 42*b* accesses the VRAM 42*d* to create game image data for drawing.

In this embodiment, a case that the GPU 42*b* generates game image data is explained, but in a case that an arbitrary application except for the game application is executed, the GPU 42*b* generates image data as to the arbitrary application.

Furthermore, the DSP 42*c* functions as an audio processor, and generates audio data corresponding to a sound, a voice, music, or the like to be output from the speaker 34*a* by means of the sound data and the sound wave (tone) data stored in the internal main memory 42*e* and the external main memory 46.

The game image data and audio data which are generated as described above are read by the AV IC 56, and output to the monitor 34 and the speaker 34*a* via the AV connector 58. Accordingly, a game screen is displayed on the monitor 34, and a sound (music) necessary for the game is output from the speaker 34*a*.

Furthermore, the input-output processor 42*a* is connected with a flash memory 44, a wireless communication module 50 and a wireless controller module 52, and is also connected with an expansion connector 60 and a connector for external memory card 62. The wireless communication module 50 is connected with an antenna 50*a*, and the wireless controller module 52 is connected with an antenna 52*a*.

Although omitted in the illustration, the input-output processor 42*a* can communicate with other game apparatuses and various servers to be connected to a network via a wireless communication module 50. It should be noted that it is possible to directly communicate with another game apparatus without going through the network. The input-output processor 42*a* periodically accesses the flash memory 44 to detect the presence or absence of data (referred to as data to be transmitted) being required to be transmitted to a network, and transmits it to the network via the wireless communication module 50 and the antenna 50*a* in a case that data to be transmitted is present. Furthermore, the input-output processor 42a receives data (referred to as received data) transmitted from another game apparatuses via the network, the antenna 50a and the wireless communication module 50, and stores the received data in the flash memory 44. In a case that the received data does not satisfy a certain condition, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives input data transmitted from the controller 22 via the antenna 52a and the wireless controller module 52, and (temporarily) stores it in the buffer area of the internal main memory 42e or the external main memory 46. The input data is erased from the buffer area after being utilized in processing (information processing such as game processing, for example) by the CPU 40.

In this embodiment, as described above, the wireless controller module 52 makes communications with the controller 22 in accordance with Bluetooth standards.

In addition, the input-output processor 42a is connected with the expansion connector 60 and the connector for external memory card 62. The expansion connector 60 is a connector for interfaces, such as USB, SCSI, etc., and can be connected with medium such as an external storage and peripheral devices such as another controller different from the controller 22. Furthermore, the expansion connector 60 is connected with a cable LAN adaptor, and can utilize the cable LAN in place of the wireless communication module 50. The connector for external memory card 62 can be connected with an external storage like a memory card. Thus, the input-output processor 42a, for example, accesses the external storage via the expansion connector 60 and the connector for external memory card 62 to store and read the data.

Although a detailed description is omitted, as also shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 is set to a mode of a normal energized state (referred to as "normal mode") in which the respective components of the game apparatus 12 are supplied with power through an AC adapter not shown. On the other hand, when the power button 20a is turned off, the system LSI 42 is set to a mode in which a part of the components of the game apparatus 12 is supplied with power, and the power consumption is reduced to minimum (hereinafter referred to as "standby mode").

In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, in this embodiment, in the standby mode, the CPU 40 never executes an application.

Moreover, the system LSI 42 is supplied with power even in the standby mode as well, the GPU 42b, the DSP 42c and the VRAM 42d are stopped to be supplied with clocks so as not to be driven, realizing reduction in power consumption.

Although illustration is omitted, inside the housing 14 of the game apparatus 12, a fan is provided for excluding heat of the IC, such as the CPU 40, the system LSI 42, etc, to outside. In the standby mode, the fan is also stopped.

However, in a case that the standby mode is not desired to be utilized, when the power button 20a is turned off, by making the standby mode unusable, the power supply to all the circuit components are completely stopped.

The switch between the normal mode and the standby mode can be performed by turning on/off the power switch. 26h of the controller 22 by a remote control operation. In a case that the remote control is not performed, electric power is set not to be supplied to the wireless controller module 52a in the standby mode.

The reset button 20b is also connected to the system LSI 42. When the reset button 20b is pushed, the system LSI 42 restarts a start-up program of the game apparatus 12. The eject button 20c is connected to the disk drive 54. When the eject button 20c is pushed, the optical disk 18 is ejected from the disk drive 54.

Figure 3:
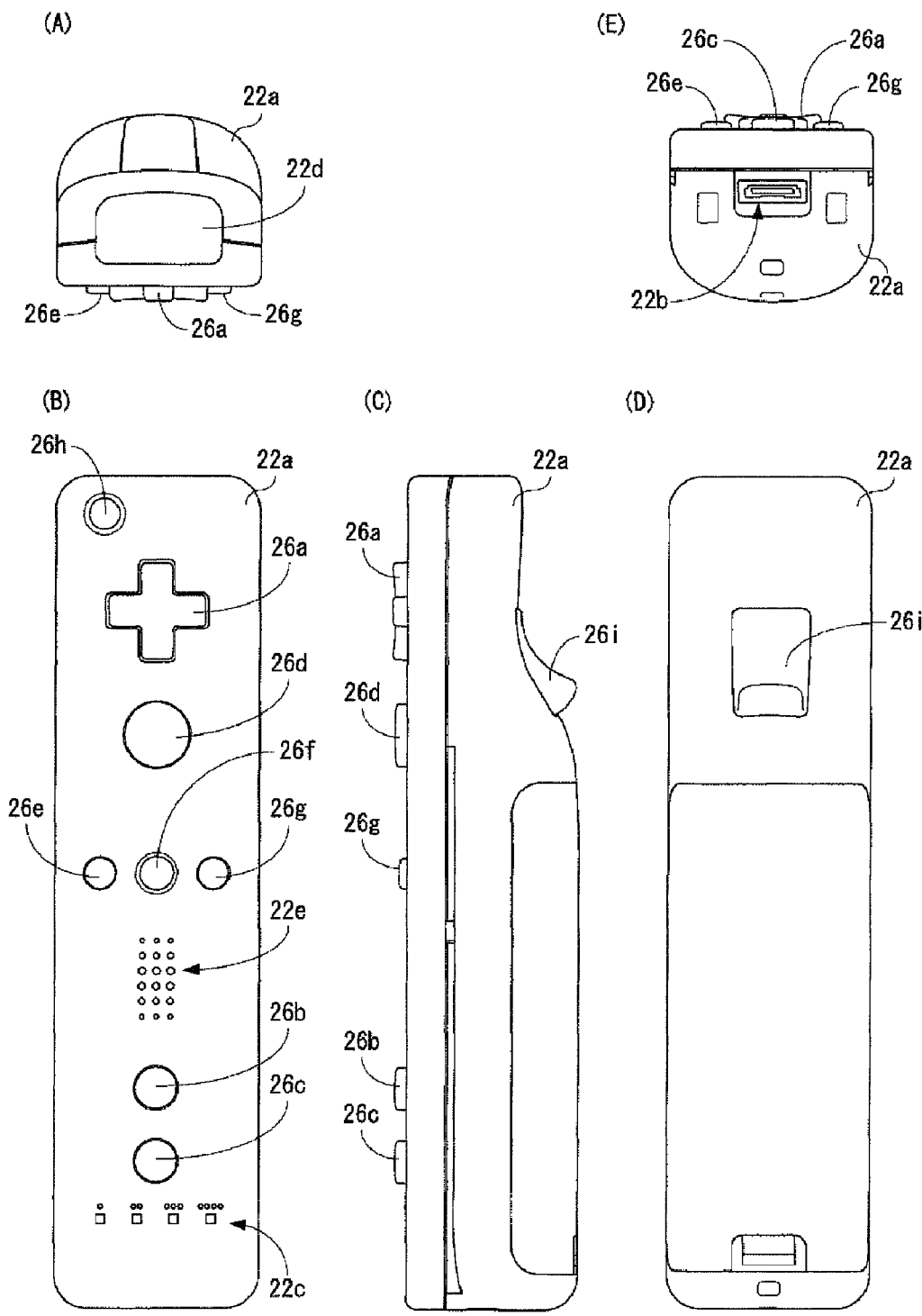
FIG. 3 is an illustrative view showing an appearance of a controller shown in FIG. 1.

Each of FIG. 3 (A) to FIG. 3 (E) shows one example of an external appearance of the controller 22. FIG. 3 (A) shows a front end surface of the controller 22, FIG. 3 (B) shows a top surface of the controller 22, FIG. 3 (C) shows a right side surface of the controller 22, FIG. 3 (D) shows a bottom surface of the controller 22, and FIG. 3 (E) shows a back end surface of the controller 22.

Referring to FIG. 3 (A) and FIG. 3 (E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3 (B), on a top face of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3 (C) and FIG. 3 (D), an inclined surface is formed on a bottom surface of the housing 22a, and a B-trigger switch 26i is formed on the inclined surface.

The cross key 26a is a four-directional-push switch, including four directions of front (or upper), back (or lower), right and left operation parts indicated by arrows. By operating any one of the operation parts, it is possible to designate a moving direction of a character or object (player character or player object) that is operable by a player, designate a moving direction of a cursor, or merely designate a direction.

The 1 button 26b and the 2 button 26c are respectively push button switches, and are used for a game operation, such as adjustment of a viewpoint position and a viewpoint direction on displaying the 3D game image, i.e. a position and an image angle of a virtual camera, and the like. Alternatively, the 1 button 26b and the 2 button 26c can be used for the same operations as those of the A-button 26d and the B-trigger switch 26i or an auxiliary operation.

The A-button switch 26d is the push button switch, and is used for causing the player character or the player object to take an action other than that a directional instruction, specifically arbitrary actions, such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Moreover, in a case that the controller 22 is used as a pointing device, the A button switch 26d is used for deciding the icon or the button image designated by the pointer (designation image) on the game screen. For example, when the icon and the button image are decided, in response thereto, an instruction or a command which are set in advance can be input.

The − button 26e, the HOME button 26f, the + button 26g, and the power supply switch 26h are also push button switches. The − button 26*e* is used for selecting a game mode. The HOME button 26*f* is used for displaying a game menu (menu screen). The + button 26*g* is used for starting (re-starting) or pausing the game. The power supply switch 26*h* is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26*i* is also the push button switch, and is mainly used for an input imitating a trigger, such as shooting and designating a position selected by the controller 22. In a case that the B-trigger switch 26*i* is continued to be pushed, it is possible to make movements and parameters of the player object constant. In a fixed case, the B-trigger switch 26*i* functions in the same way as the normal B-button, and is used for canceling the action determined by the A-button 26*d*.

in addition, as shown in FIG. 3(E), an external expansion connector 22*b* is provided on a back end surface of the housing 22*a*, and as shown in FIG. 3 (B), an indicator 22*c* is provided on the top surface and at the rear of the housing 22*a*. The external expansion connector 22*b* is used for connecting an expansion controller (not illustrated) different from the controller 22, etc. The indicator 22*c* is made up of four LEDs, for example, and shows identification information (controller number) of the controller 22 corresponding to the lighting LED by lighting any one of the four LEDs. Furthermore, the indicator 22*c* shows the remaining amount of power of the controller 22 depending on the number of LEDs to be emitted.

Furthermore, the controller 22 has an imaged information arithmetic section 80 (see FIG. 4), and is provided with a light incident opening 22*d* of the imaged information arithmetic section 80 on the front end surface of the housing 22*a* as shown in FIG. 3 (A). Furthermore, the controller 22 has a speaker 86 (see FIG. 4), and the speaker 86 is provided inside the housing 22*a* at the position corresponding to a sound release hole 22*e* between the 1 button 26*b* and the HOME button 26*f* on the tope surface of the housing 22*a* as shown in FIG. 3 (B).

Note that, the shape of the controller 22 and the shape, number and setting position of each input means 26 shown in FIG. 3 (A) to FIG. 3 (E) are simply examples, and it is needless to say that even if they are suitably modified, the present invention can be realized.

Figure 4:
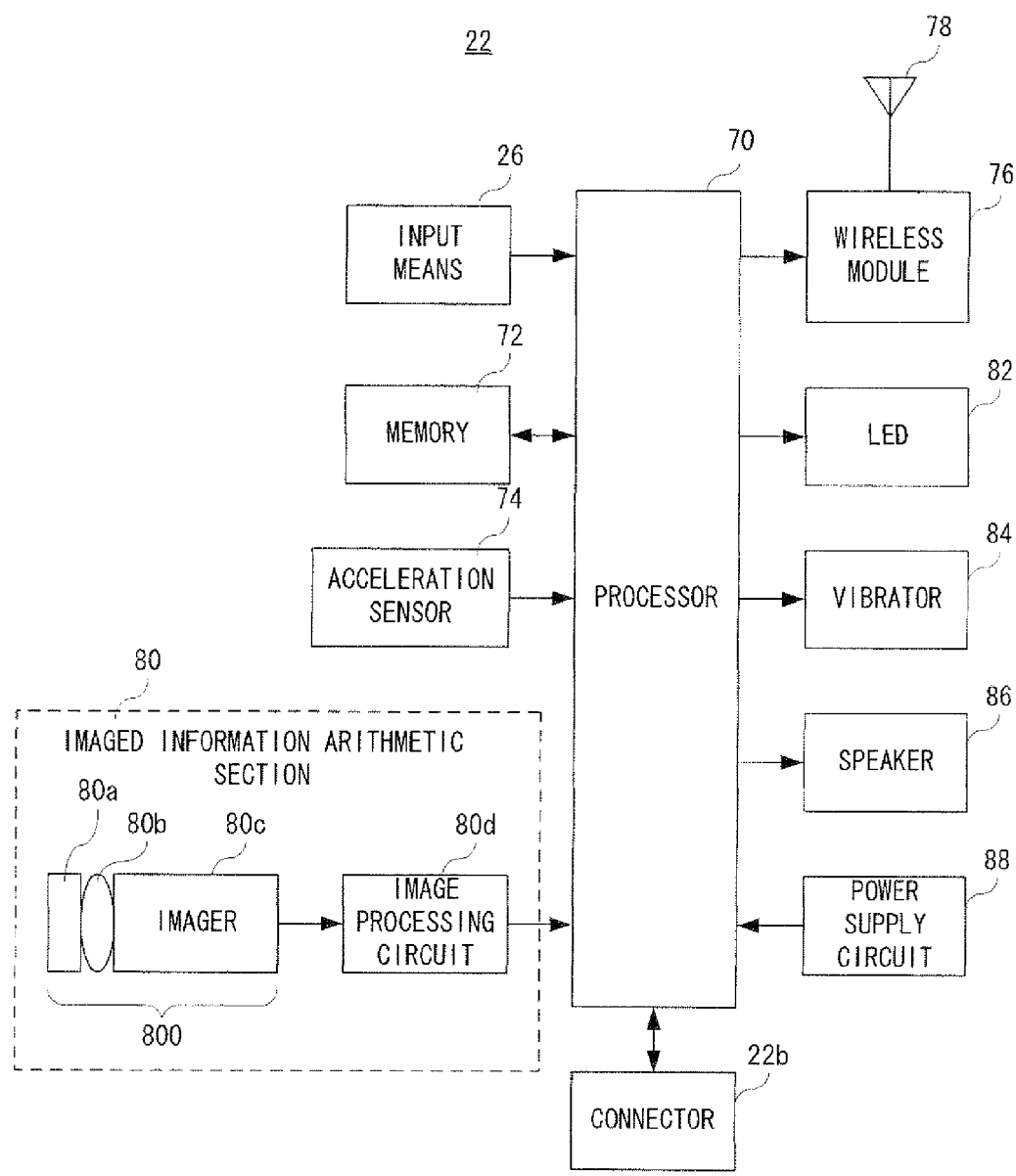
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22*b*, the input means 26, a memory 72, an acceleration sensor 74, a wireless module 76, the imaged information arithmetic section 80, an LED 82 (the indicator 22*c*), an vibrator 84, a speaker 86, and a power supply circuit 88 by an internal bus (not shown). Moreover, an antenna 78 is connected to the wireless module 76.

It should be noted that although omitted in FIG. 4 for simplicity, the indicator 22*c* is made up of four LEDs 82 as described above.

The processor 70 is in charge of an overall control of the controller 22, and transmits (inputs) information (input information) input by the input means 26, the acceleration sensor 74, and the imaged information arithmetic section 80 as input data, to the game apparatus 12 via the wireless module 76 and the antenna 78. At this time, the processor 70 uses the memory 72 as a working area or a buffer area. The operation signal (operation data) from the aforementioned input means 26 (26*a* to 26*i*) is input to the processor 70, and the processor 70 temporarily stores the operation data in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be the hereafter.) The processor 70 detects the acceleration data given from the acceleration sensor 74 for each second predetermined time, and temporarily stores it in the memory 72.

The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3 (A) to FIG. 3 (E), the acceleration sensor 74 is provided on the circuit board at a position corresponding to the place where the cross key 26*a* is arranged inside the housing 22*a*.

The wireless module 76 modulates a carrier of a predetermined frequency by the input data by using a technique of Bluetooth, for example, and emits its weak radio wave signal from the antenna 78. Namely, the input data is modulated to the weak radio wave signal by the wireless module 76 and transmitted from the antenna 78 (controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of the application, following the obtained input data and the application program.

In addition, as described above, the controller 22 is provided with the imaged information arithmetic section 80. The imaged information arithmetic section 80 is made up of an infrared ray filter 80*a*, a lens 80*b*, an imager 80*c*, and an image processing circuit 80*d*. The infrared ray filter 80*a* passes only infrared rays from the light incident from the front of the controller 22. As described above, the markers 340*m* and 340*n* placed near (around) the display screen of the monitor 34 are infrared LEDs for outputting infrared lights forward the monitor 34. Accordingly, by providing the infrared ray filter 80*a*, it is possible to image the image of the markers 340*m* and 340*n* more accurately. The lens 80*b* condenses the infrared rays passing thorough the infrared ray filter 80*a* to emit them to the imager 80*c*. The imager 80*c* is a solid imager, such as a CMOS sensor and a CCD, for example, and images the infrared rays condensed by the lens 80*b*. Accordingly, the imager 80*c* images only the infrared rays passing through the infrared rays filter 80*a* to generate image data. Hereafter, the image imaged by the imager 80*c* is called an "imaged image". In addition, an imaging device (camera) 800 is made up of the infrared ray filter 80*a*, the lens 80*b*, and the imager 80*c*. The image data generated by the imager 80*c* is processed by the image processing circuit 80*d*. The image processing circuit

80d calculates a position of an object to be imaged (markers 340m and 340n) within the imaged image, and outputs each coordinate value indicative of the position to the processor 70 as imaged data (marker coordinates data described later) for each fourth predetermined time. It should be noted that a description of the process in the image processing circuit 80d is made later.

Although illustration is omitted, in a case that a power supply to the attachment device 36 is performed by the controller 22, the connector 22b and the attachment device 36 (touch panel 360b: see FIG. 8 and FIG. 9) are connected by a power cable (not illustrated). Then, under the control of the processor 70, power is supplied from the power supply circuit 88 to the attachment device 36 (touch panel 360b) or stopped.

Here, in a case that a power supply like a battery is provided to the attachment device 36, the connector 22b and the attachment device 36 need not be connected by the power cable.

Figure 5:
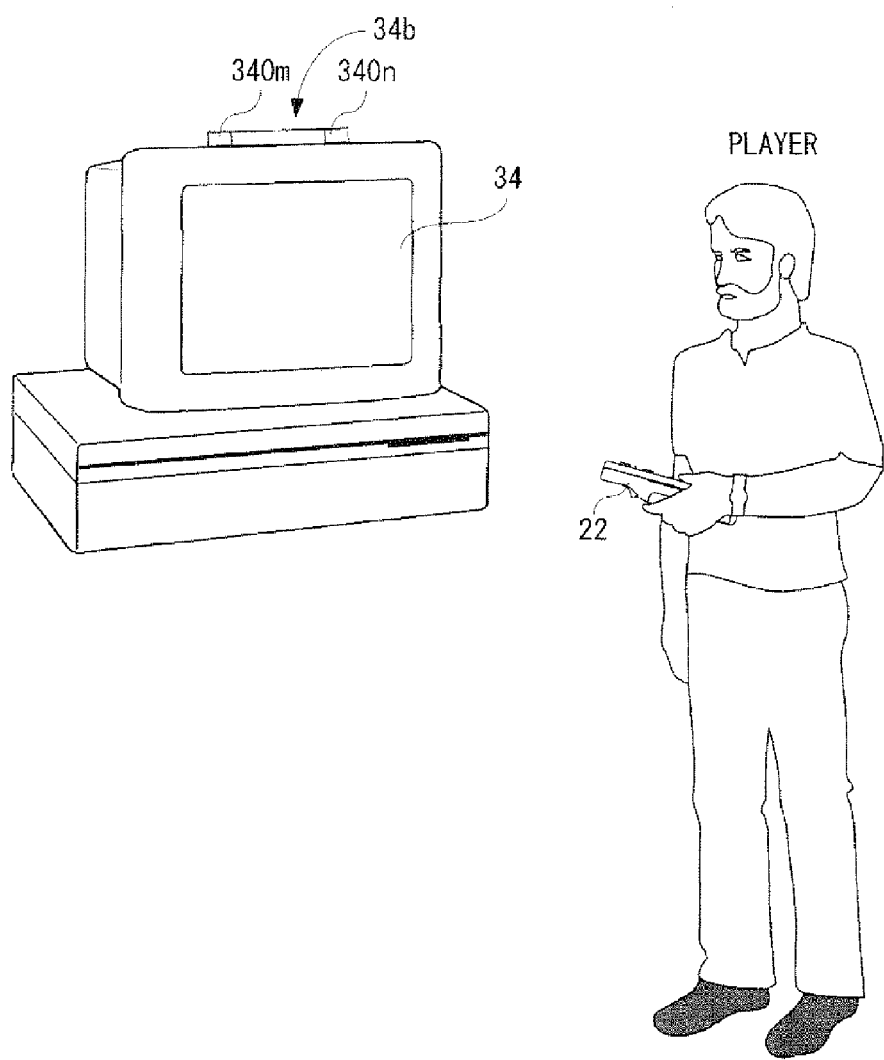
FIG. 5 is an illustrative view showing a situation in which a virtual game is played by utilizing the controller shown in FIG. 1.

FIG. 5 is an illustrative view summarizing a state when a player plays a game by utilizing the controller 22. It should be noted that this holds true for a case that another application other than the game play is executed. Here, an explanation is made on a case that the attachment device 36 is not attached to the controller 22 for convenience of explanation. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen indicated by the controller 22, and changing a distance between the controller 22 and each of the markers 340m and 340n.

Figure 6:
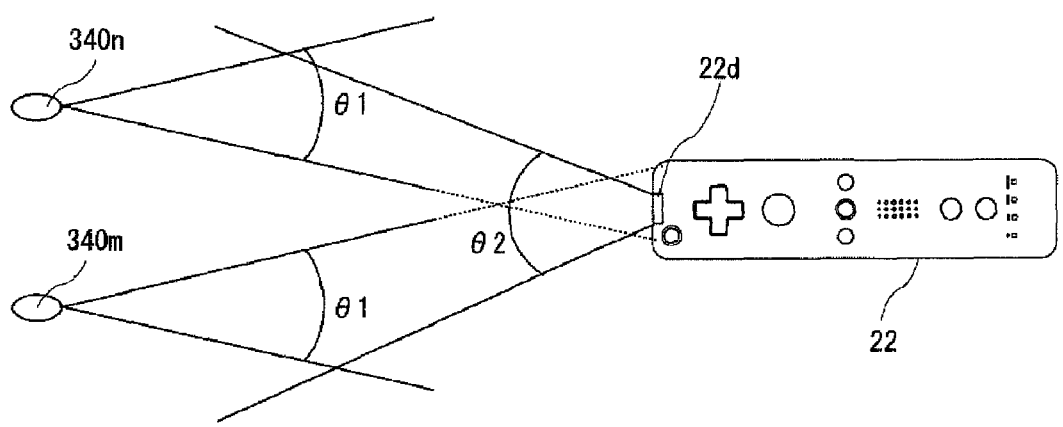
FIG. 6 is an illustrative view explaining viewing angles of makers and the controller shown in FIG. 1.

FIG. 6 is an illustrative view showing viewing angles between the respective markers 340m and 340n, and the controller 22. As shown in FIG. 6, each of the markers 340m and 340n emits infrared ray within a range of a viewing angle θ1. Also, the imager 80c of the imaged information arithmetic section 80 can receive incident light within the range of the viewing angle θ2 taking the line of sight of the controller 22 as a center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the two markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state, the controller 22 can detect at least one of the markers 340m and 340n. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range".

Figure 7:
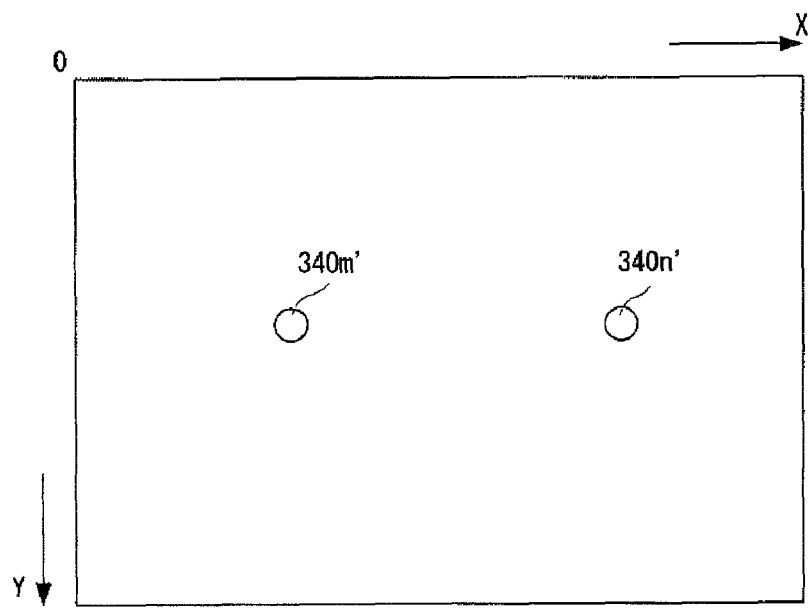
FIG. 7 is an illustrative view showing one example of an imaged image including objective images.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is an illustrative view showing one example of the imaged image including object images. The image processing circuit 80d calculates coordinates (marker coordinates) indicative of the position of each of the markers 340m and 340n in the imaged image by utilizing the image data of the imaged image including the object images.

Since the object image appears as a high-intensity part in the image data of the imaged image, the image processing circuit 80d first detects the high-intensity part as a candidate of the object image. Next, the image processing circuit 80d determines whether or not the high-intensity part is an object image on the basis of the size of the detected high-intensity part. The imaged image may include images other than the object image due to sunlight through a window and light of a fluorescent lamp in the room as well as the images 340m' and 340n' of the two markers 340m and 340n as object images. The determination processing whether or not the high-intensity part is an object image is executed for discriminating the images 340m' and 340n' as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity part. More specifically, the barycenter position of the high-intensity part is calculated. Here, the coordinate of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is correctly detected, two high-intensity parts are determined as object images by the determination processing, and therefore, two marker coordinates are calculated. The image processing circuit 80d outputs data indicative of the calculated two marker coordinates. The data (marker coordinate data) of the output marker coordinates is included in the input data by the processor 70 as described above, and transmitted to the game apparatus 12.

The game apparatus 12 (CPU 40) detects the marker coordinate data from the received input data to thereby calculate a designated position (designated coordinate) by the controller 22 on the screen of the monitor 34 and distances from the controller 22 to the respective markers 340m and 340n on the basis of the marker coordinate data. More specifically, from the position of the mid point of the two marker coordinates, a position to which the controller 22 faces, that is, a designated position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates. In addition, from the inclination of the straight line passing through the two marker coordinates, an amount of rotation of the controller 22 when the light incident opening 22*d* of the controller 22 is turned to the markers 340*m* and 340*n* (monitor 34) can be detected with a longitudinal direction of the controller 22 as a rotation axis.

Figure 8:
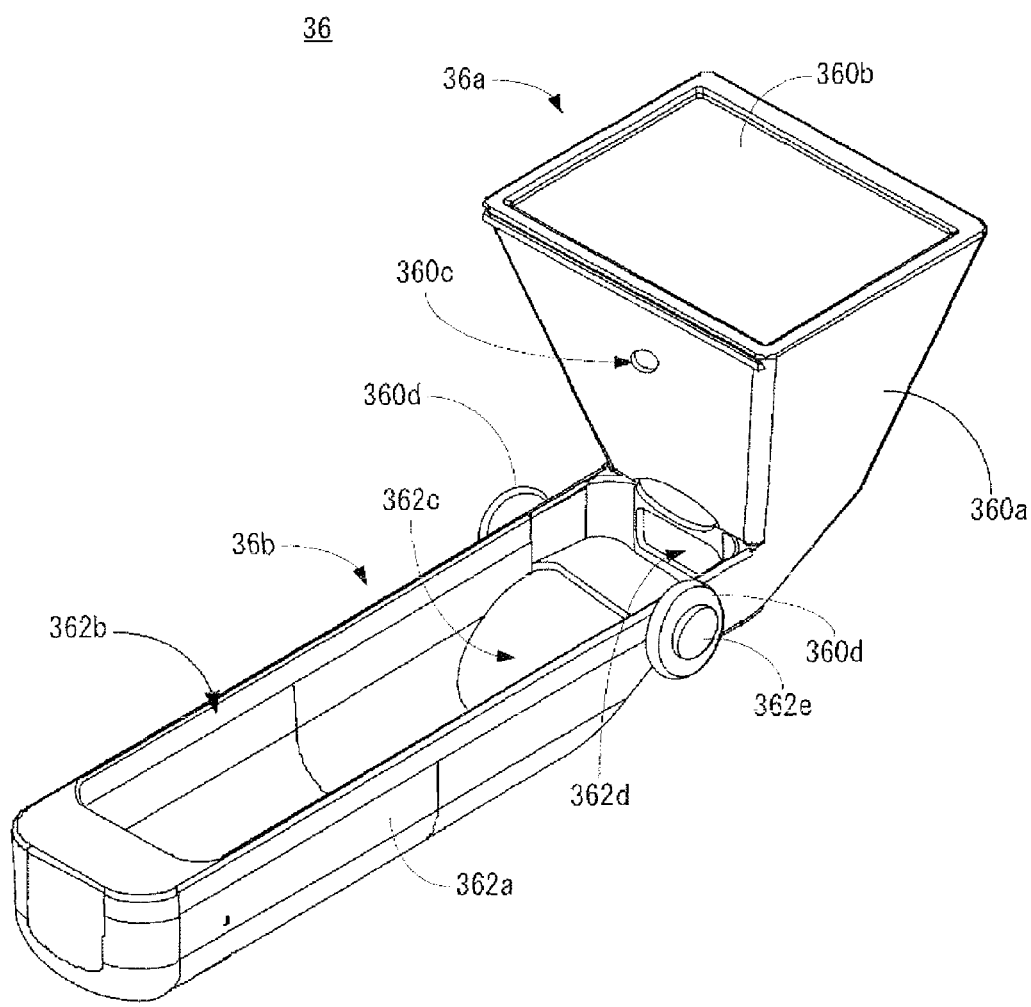
FIG. 8 is a perspective view showing an external configuration of the attachment device to be attached to and detached from the controller shown in FIG. 1.
Figure 9:
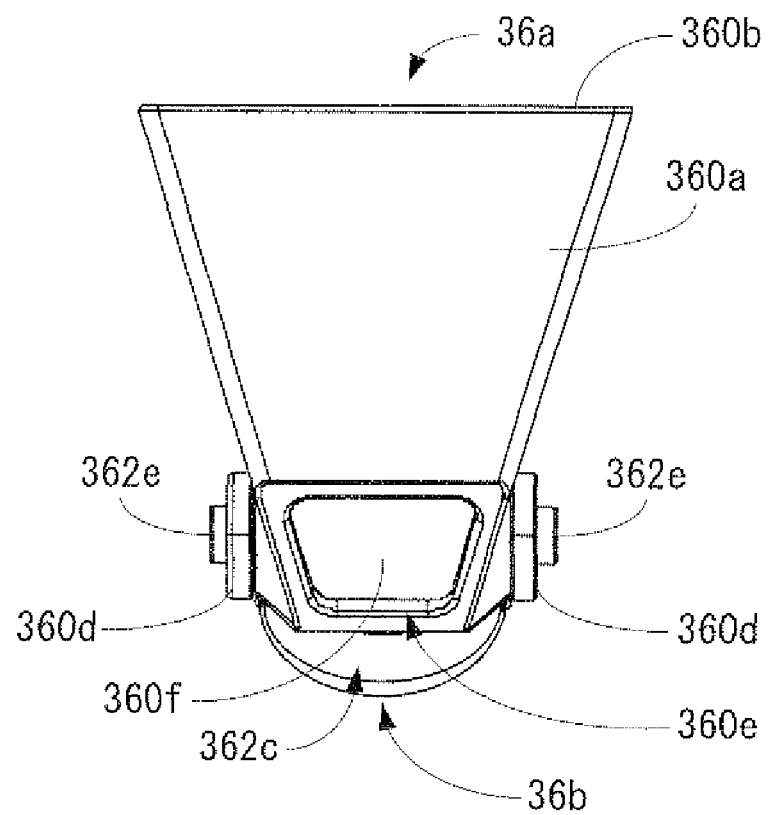
FIG. 9 is a front view of the attachment device to be attached to and detached from the controller shown in FIG. 1.
Figure 10:
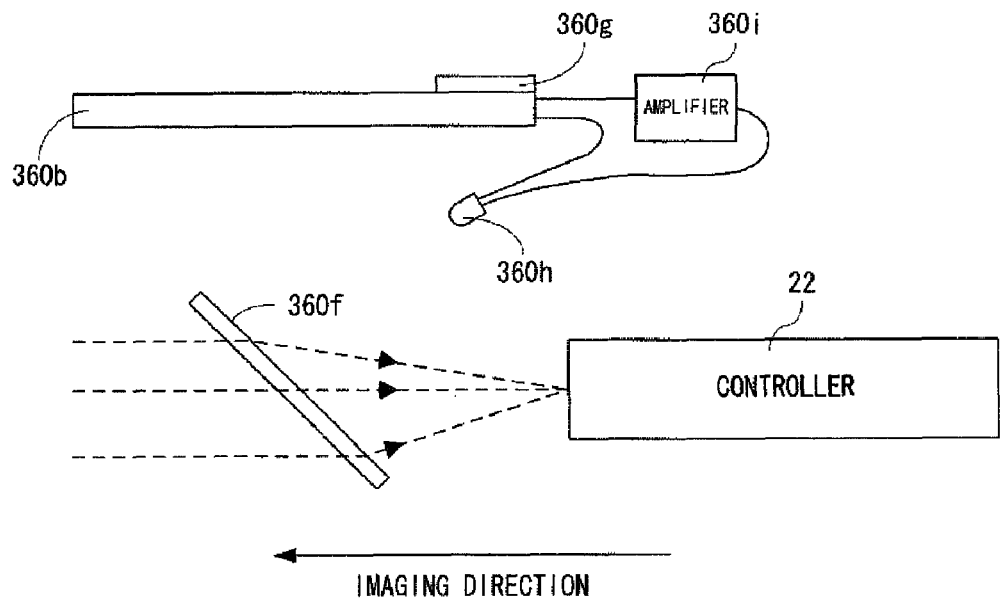
FIG. 10 is an illustrative view showing an internal configuration of the attachment device and usage of the controller attached with the attachment device.
Figure 10:
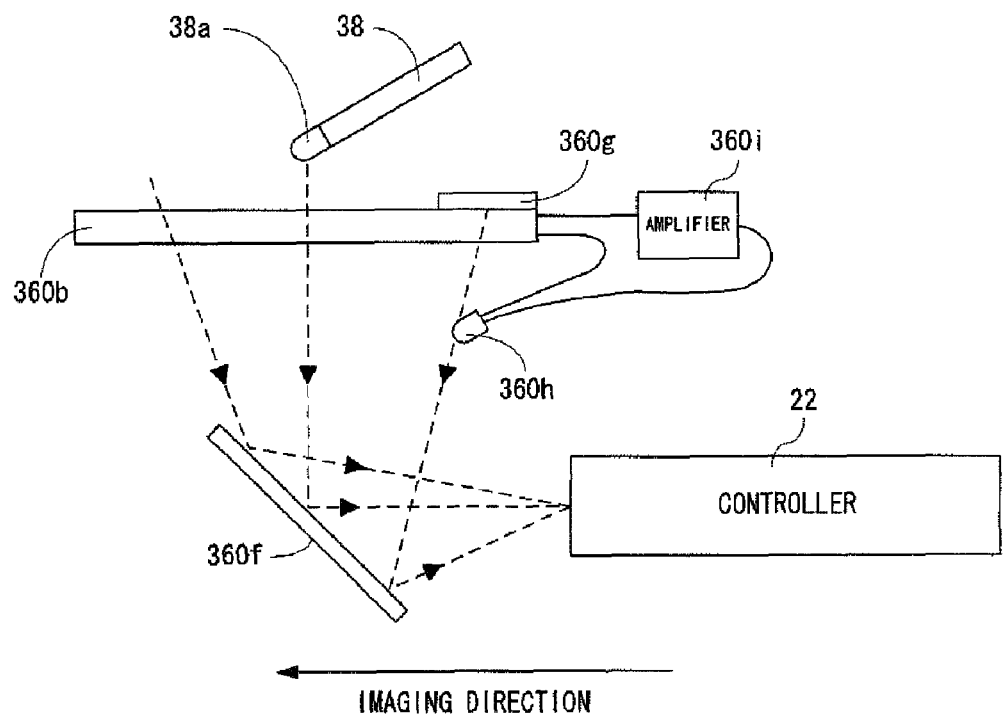

FIG. 8 is a perspective view showing an external configuration of the attachment device to be attached to and detached from the controller 22. As shown in FIG. 8, the attachment device 36 is made up an input operation portion 36*a* and a cover 36*b*. The input operation portion 36*a* includes a casing 360*a* having an appearance obtained by flipping a frustum of a quadrangular pyramid from top to bottom, and at the position corresponding to a bottom surface of the frustum of the quadrangular pyramid, a touch panel 360*b* is provided. Furthermore, on a side surface of the casing 360*a* (the side surface on the side of the cover 36*b* in this embodiment), a mounting hole 360*c* is provided. Although omitted in FIG. 8, an infrared LED 360*h* (see FIG. 10) as a light source is attached to the mounting hole 360*c* so as to emit light inside the input operation portion 36*a* (casing 360*a*). In addition, although it is difficult to understand in FIG. 8, the casing 360*a* is provided with a connecting portion 360*d* extending to the side of the top surface of the frustum of the quadrangular pyramid. The connecting portion 360*d* is utilized for connecting the input operation portion 36*a* and the cover 36*b*. Moreover, as shown in FIG. 9, when the attachment device 36 is seen from the front, an opening 360*e* is provided at the bottom of the casing 360*a* on the opposite side of the cover 36*b*. The opening 360*e* has approximately the same in size (shape) as the light incident opening 22*d* of the controller 22 and a half mirror 360*f* described later when they are seen from a front. Additionally, at the bottom of the casing 360*a* inside the input operation portion 36*a*, the half mirror 360*f* is provided.

Returning to FIG. 8, the cover 36*b* includes a body 362*a*, and the body 362*a* is constructed to contain the controller 22. On a top surface of the body 362*a*, an opening 362*b* for making the switches or the buttons (26*a*-26*h*) provided on the top surface of the controller 22 operable and making the indicator 22*c* provided on the top surface of the controller 22 viewable is provided. Furthermore, an opening 362*c* for making the B trigger switch 26*i* operable is provided on a bottom surface of the body 362*a* on a side of the front of the body 362*a* (on the side of the input operation portion 36*a*). In addition, on a front surface of the body 362*a*, an opening 362*d* for making light incident to the light incident opening 22*d* (imaging device 800) of the controller 22 is provided. Moreover, on both sides of the body 362*a* on the side of the front end, respective connecting portions 362*e* to be connected to the above-described connecting portions 360*d* are provided.

Each of FIG. 10(A) and FIG. 10(B) is a schematic diagram showing the controller 22, a part of the input operation portion 36*a*, and a pen input device 38. In FIG. 10(A) and FIG. 10(B), for simplicity, the casing 360*a* and the body 362*a* are omitted. Furthermore, each of FIG. 10(A) and FIG. 10(B) shows a case when the controller 22 attached with the attachment device 36 is seen from a left side of the controller 22.

As shown in FIG. 10(A) and FIG. 10(B), the half mirror 360*f* is provided beneath the center of the touch panel 360*b*. In addition, at the right of the half mirror 360*f*, the controller 22 is arranged. That is, the half mirror 360*f* is provided inside the casing 360*a* in an imaging direction of the imaging device 800 with respect to the controller 22. Furthermore, between the touch panel 360*b* and the half mirror 360*f* and inside the side surface of the casing 360*a* as described above, an infrared LED 360*h* is provided.

For example, as a touch panel 360*b*, a touch panel of a resistance film system can be used. The touch panel 360*b* is for passing infrared rays. Accordingly, the touch panel 360*b* can employ an arbitrary push-type touch panel without being restricted to the resistance film system if only it passes infrared rays.

Furthermore, the arrangement position of the controller 22, the touch panel 360*b*, the half mirror 360*f* and the infrared LED 360*h* (positional relationship) is fixedly decided by attaching the attachment device 36 to the controller 22. In this embodiment, the size of the touch panel 360*b* and the distance between the touch panel 360*b* and the half mirror 360*f* (the height of the casing 360*a* taking a shape of a frustum of a quadrangular pyramid) are decided by the angle of view of the imaging device 800 (imager 80*c*) integrated in the controller 22.

Furthermore, as shown in FIG. 10(A) and FIG. 10(B), a cover 360*g* is provided on a top surface of the touch panel 360*b* above the infrared LED 360*h*. The cover 360*g* is for preventing an infrared ray from being incident to the inside of the input operation portion 36*a* via the touch panel 360*b*. Moreover, this is for preventing an infrared ray other than the infrared ray output from the infrared LED 360*h* from being detected within a range (area) covered with the cover 360*g* on the touch panel 360*b*.

In this embodiment, the cover 360*g* is provided here, but since it is only necessary to intercept an infrared ray, coating in color (block) which does not pass an infrared ray may be applied in place of the cover 360*g*.

Furthermore, a power source cable is connected from one terminal (ground) of the touch panel 360*b* to one terminal (cathode) of the infrared LED 360*h*, and the power source cable is connected from the other terminal (output terminal of the coordinate data) of the touch panel 360*h* to the other terminal (anode) of the infrared LED 360*h* via an amplifier 360*i*.

Accordingly, in this embodiment, in a case that the touch panel 360*b* is touched by the pen input device 38, a finger, or the like, data as to a touched position (position data) is output from the touch panel 360*b*. The position data is transformed into a drive power of the infrared LED 360*h* by the amplifier 360*i*. Thus, the infrared LED 360*h* emits light. On the other hand, in a case that touch panel 360*b* is not touched by the pen input device 38, a finger, or the like, position data is not output from the touch panel 360*b*. Thus, the infrared LED 360*h* does not emit light. The presence or absence of a touch is determined by the presence or absence of the position data, but it is only necessary to perceive that the pen touches, and therefore, the touch panel 360*b* is not required to accurately output a position, and may be one which can determine whether it is touched or not.

In this embodiment, by the blink of the infrared LED 360*h*, whether or not the touch panel 360*b* is touched is determined. Thus, as shown in FIG. 11(A), out of the entire area of the touch panel 360*b*, the range (area) provided with the cover 360*g* is an area for determining whether or not the touch panel 360*b* is touched (detection area) and the range (area) other than this is an input area.

Figure 11:
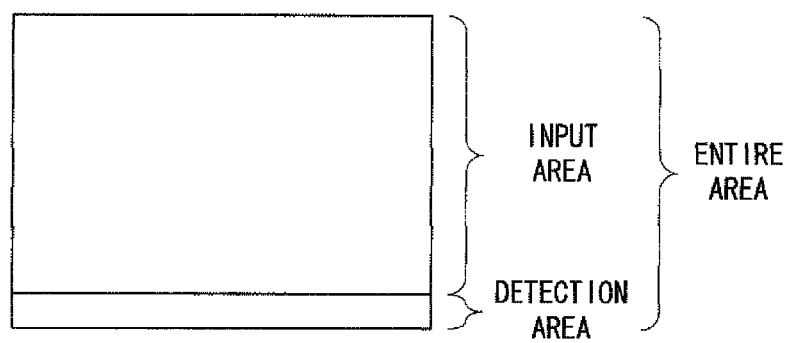
FIG. 11 is an illustrative view showing an area of a touch panel attached to the attachment device and an area of an imaged image corresponding to the area of the touch panel.
Figure 11:
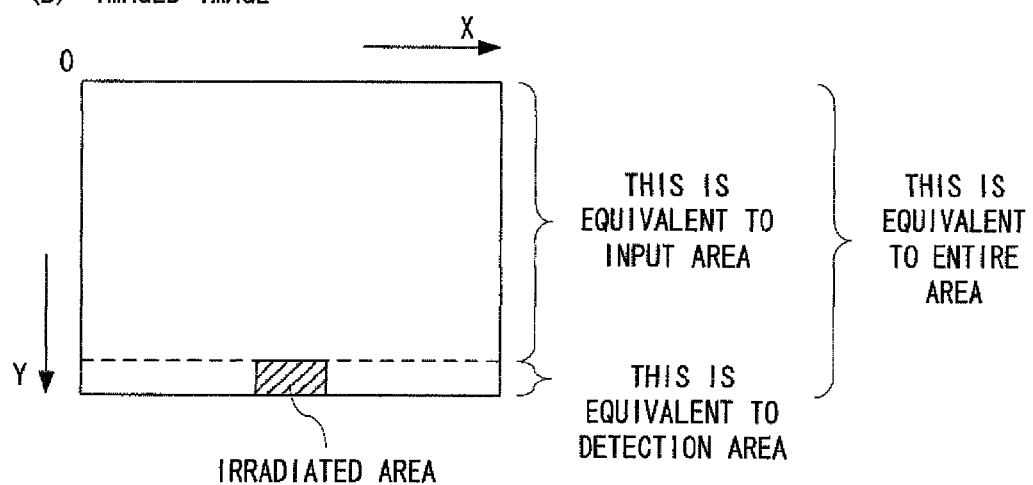

Accordingly, if a high-intensity part corresponding to the infrared ray is detected in the area corresponding to the detection area of the imaged image shown in FIG. 11(B), it can be determined that the touch panel 360*b* is touched on. On the other hand, if a high-intensity part corresponding to the infrared ray is not detected in the area corresponding to the detection area of the imaged image, it can be determined that the touch panel 360b is touched off. The coordinate data as to the position or the range of the detection area in such an imaged image is stored in the game apparatus 12 in advance. Thus, on the basis of the fact whether or not the position (coordinate) indicated by the marker coordinate data included in the input data from the controller 22 is included in the area corresponding to the detection area, it can be determined whether or not the pen input device 38 touches the touch panel 360b.

Furthermore, in a case that a player or a user draws a character, etc. in the input area of the touch panel 360b in a state that the touch panel 360b is touched on, a high-intensity part corresponding to the infrared ray output from the infrared LED 38a of the pen input device 38 is further detected in the imaged image. Thus, as to the game apparatus 12, a designated position on the screen of the monitor 34 according to the coordinate data of the area corresponding to the input area can be decided on the basis of the marker coordinate data included in the input data from the controller 22. Thus, the game apparatus 12 displays a designation image, such as a mouse pointer and a cursor and displays a point at the designated position, for example.

it should be noted that in FIG. 11(B), for simplicity, an image of an infrared ray (corresponding to an object image) included in the imaged image is omitted.

Moreover, as shown in FIG. 11(B), an area (slanted irradiated area) onto which an infrared ray output from the infrared LED 360h is to be irradiated is an area corresponding to a part of the detection area, and thus, the area other than the irradiated area can be set as an input area.

Returning to FIG. 10(A), as to the controller 22 attached with the attachment device 36, for example, the infrared ray in the imaging direction of the imaging device 800 integrated in the controller 22 is incident to the light incident opening 22d of the controller 22 via (passing through) the half mirror 360. In such a case, as explained by utilizing FIG. 5-FIG. 7, the controller 22 is used for a coordinate input, etc. on the monitor 34 by imaging an image including the two marker 340m and marker 340n. That is, it is possible to use the controller 22 as a coordinate input device (hereinafter referred to as "normal coordinate input device") used for a coordinate input, etc.

On the other hand, as to the controller 22 attached with the attachment device 36 as shown in FIG. 10(B), an infrared ray emitted from the light-emitting portion 38a of the pen input device 38 passes through the touch panel 360b, is reflected by the half mirror 360f, and incident to the light incident opening 22d of the controller 22. In such a case, the controller 22 can be used as a pen tablet, for example.

For example, a case that the controller 22 is used as a normal coordinate input device and a case that it is used as a pen tablet can be switched in response to a request from an application program, such as an information processing program. For example, in the former, power is supplied from the game apparatus 12 to the markers 340m, 340n, but power is not supplied to the touch panel 360b from the controller 22 according to an instruction from the game apparatus 12. Furthermore, in a case that power is supplied from the controller 22 to the pen input device 38, power supply to the pen input device 38 (light-emitting portion 38a) is also not performed.

In the latter, power is not supplied from the game apparatus 12 to the markers 340m, 340n, but power is supplied from the controller 22 to the touch panel 360b according to an instruction from the game apparatus 12. Furthermore, in a case that power is supplied from the controller 22 to the pen input device 38, power supply to the pen input device 38 (light-emitting portion 38a) is also performed.

Here, in a case that a battery is provided to the attachment device 36 or the pen input device 38, a switch (not illustrated) for stopping supply of power from the battery is provided, and in case that the controller 22 is used as a normal coordinate input device, the switch may be turned off, and in a case that the controller 22 is used as a pen tablet, the switch may be turned on. In this case, the switch can be electrically turned on and off, and the switch may be turned on and off under the control of the controller 22.

This can stop the power supply and reduce useless electric power consumption when the markers 340m, 340n or the touch panel 360b are not used.

Furthermore, as shown in FIG. 10(B), in a case that the controller 22 is used as a pen tablet, processing by the game apparatus 12 (CPU40) is different depending on whether or not the pen input device 38 touches the touch panel 360b. A method of determining whether or not the pen input device 38 touches the touch panel 360b is as described above, and a redundant explanation is omitted.

For example, when the user or the player draws a character, etc. on the input area of the touch panel 360b by using the pen input device 38, the game apparatus 12 detects that the pen input device 38 touches the touch panel 360b and that there is an input to the input area on the basis of the marker coordinate data. Accordingly, for example, according to the position (designated position) designated by the pen input device 38 in the input area, an image (designation image) for designating the designated position and a point are displayed (drawn) on the screen of the monitor 34, and depending on the change of the designated position, the designation image moves, and the point is successively displayed (drawn). Accordingly, a line is drawn.

On the other hand, in a case that the user or the player releases the pen input device 38 from the touch panel 360b, it is determined that the character, etc. is not drawn, but the processing by the game apparatus 12 (CPU40) is further different between when the pen input device 38 is above the touch panel 360b and when the pen input device 38 is not above the touch panel 360b.

In a case that the pen input device 38 is spaced above the touch panel 360b, an image including an infrared ray from the infrared LED 38a of the pen input device 38 is imaged by the imaging device 800, so that input data including marker coordinate data as to the high-intensity part corresponding to the infrared ray is transmitted from the controller 22 to the game apparatus 12. Thus, according to the designated position by the pen input device 38 within the range of the input area, only the designation image for designating the designated position is displayed on the screen of the monitor 34. That is, in such a case, it is determined that the pen input device 38 is in a state of being merely moved, and a character, etc. is not in a state of being actually drawn, and the designation image on the screen is displayed and moved according to the position and the trace of the infrared ray detected in the area corresponding to the input area.

In a case that the pen input device 38 is not above the touch panel 360b, an image not including an infrared ray output from the infrared LED 38a of the pen input device 38 is imaged by the imaging device 800, so that, input data not including at least marker coordinate data is transmitted to the game apparatus 12 from the controller 22. In such a case, there is no marker coordinate data, and thus, the designation image is not displayed on the monitor 34. That is, in such a case, the pen input device 38 is in a state of being removed out of the touch panel 360b.

Thus, by using the attachment device 36 and the pen input device 38, the controller 22 is used as a pen tablet, capable of performing an intuitive operation.

According to this embodiment, by attaching the attachment device to the controller provided with the imaging device, it is possible to use the controller as different kinds of pointing devices, such as the normal coordinate input device and the pen tablet. That is, it is possible to effectively use the imaging device provided to the controller.

Here, in this embodiment, whether the pen input device touches the panel is determined by using the touch panel to thereby allow an intuitive operation, but it is not restricted thereto. For example, in a case that a predetermined operating switch (A button, etc.) provided to the controller is turned on, it may be determined that a character, etc. is in a state of being actually drawn, and in a case that a predetermined operating switch is turned off, it may be determined that the pen input device is in a state of being merely moved or that the pen input device is in a state of being removed out of the panel provided to the attachment device. Although illustration is omitted, the tip end provided with the infrared LED of the pen input device is configured to be displaceable in a longitudinal direction of the pen input device, and a switch that changes over between on and off by the displacement is provided inside the pen input device. By inputting an on/off signal of the switch to the controller, it may be determined whether or not the pen input device touches the panel. In such a case, the controller and the pen input device are electrically connected, and an on/off signal of the aforementioned switch has to be transmitted from the pen input device to the controller.

This configuration allows a panel passing an infrared ray to be used in place of the touch panel, and can regard the entire area of the panel as an input area. Moreover, in such a case, a cover, an infrared LED and an amplifier need not be provided to the attachment device.

Additionally, in this embodiment, the marker coordinate data of the high-intensity part corresponding to the infrared ray output from the infrared LED provided inside the attachment device is also transmitted to the game apparatus, and the game apparatus determines whether or not the pen input device touches the touch panel, but this determination processing may be executed by the controller. In such a case, the controller transmits data for a determination result as to whether the pen input device touches the touch panel (touch determination data) to the game apparatus in addition to the input data.

In addition, in this embodiment, the cover for the controller is provided to the attachment device, but the cover is not required to be provided. Here, in such a case, the bottom end portion (part corresponding to the top surface of the frustum of a quadrangular pyramid) of the input operation portion is configured such that the attachment device can mount the controller.

Furthermore, in this embodiment, inside the side surface of the cover of the casing (controller), the infrared LED for determining whether or not the pen input device touches the panel is provided, but the infrared LED may be provided at another side surface or at another corner of the casing. In such a case, depending on the position of the infrared LED for determining whether or not the pen input device touches the panel, the position and the range (size) of the detection area of the touch panel and the position and the range (size) of the area equivalent to the detection area of the corresponding imaged image may be appropriately changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An input device transmitting data to an information processing apparatus, comprising:
   an imaging device;
   a position calculator which calculates a position of a high-intensity part within an image imaged by said imaging device;
   a transmitter which transmits data as to a position of said high-intensity part;
   a half mirror which is provided in an imaging direction of said imaging device, passes light in said imaging direction, and reflects light in a direction different from said imaging direction toward said imaging device;
   a panel which is provided at a position enabling light to be incident to said half mirror, and is able to make an input through an input portion having at least a first light source.

2. An input device according to claim 1, further comprising a second light source which is arranged in a specific position between said half mirror and said panel.

3. An input device according to claim 2, further comprising a detector which detects a touch of said panel, wherein
   said second light source emits light when said detector detects a touch of said panel.

4. An input device according to claim 3, wherein
   said panel and said detector are a touch panel.

5. An input device according to claim 4, comprising:
   a first unit which includes said imaging device, said position calculator and said transmitter; and
   a second unit which is detachably attached to said first unit, and includes said half mirror, said panel, said detector, and said second light source.

6. An input device according to claim 1, wherein
   a size of said panel is decided on the basis of an angle of view of said imaging device.

7. An information processing system having an input device according to claim 1 and an information processing apparatus executing information processing by receiving data from said input device, wherein
   said information processing apparatus comprises:
      a receiver which receives data as to said position transmitted by said transmitter;
      a determiner which specifies a position following the data as to said position received by said receiver, and determines the presence or absence of the light from said second light source;
      a first information processor which executes first information processing based on the data as to said position in a case that said determiner determines that there is light from said second light source; and
      a second information processor which executes second information processing different from said first information processing based on the data as to said position in a case that said determiner determines that there is not light from said second light source.

8. An information processing system according to claim 7, further comprising:
   a third light source which is arranged at a predetermined position, and a light source controller which turns said third light source off when said first information processor executes said first information processing, wherein
   said first information processor executes said first information processing on the basis of said first light source, and
   said second information processor executes said second information processing on the basis of said third light source.

* * * * *